United States Patent [19]
Miyajima et al.

[11] Patent Number: 5,635,565
[45] Date of Patent: Jun. 3, 1997

[54] POLYMERIZED AROMATIC VINYL AND VINYL CYANIDE ONTO RUBBER

[75] Inventors: Hajime Miyajima, Yokkaichi; Tsugio Asakawa, Suzuka; Noriaki Ijuin, Yokkaichi; Hiroo Nakamura, Tsu; Toshihiro Ogawa; Shinichi Kimura, both of Yokkaichi, all of Japan

[73] Assignee: Japan Synthetic Rubber Co., Ltd., Tokyo, Japan

[21] Appl. No.: 574,166

[22] Filed: Dec. 18, 1995

[30] Foreign Application Priority Data

Jan. 13, 1995 [JP] Japan ................................. 7-020934
May 23, 1995 [JP] Japan ................................. 7-148219

[51] Int. Cl.$^6$ ........................... C08F 255/08; C08L 51/04
[52] U.S. Cl. ........................ 525/242; 525/279; 525/282; 525/285; 525/286; 525/293; 525/296; 525/301; 525/303; 525/310; 525/70; 525/73; 525/84
[58] Field of Search ............................ 525/242, 279, 525/282, 285, 286, 293, 296, 301, 303, 310

[56] References Cited

U.S. PATENT DOCUMENTS

| | | | |
|---|---|---|---|
| 4,396,654 | 8/1983 | Abe et al. | 525/316 |
| 4,563,505 | 1/1986 | Abe et al. | 428/35 |
| 4,873,289 | 10/1989 | Lindner et al. | 525/242 |
| 5,191,018 | 3/1993 | Hagiwara et al. | 525/242 |

FOREIGN PATENT DOCUMENTS 1219949  1/1971  United Kingdom ................ 525/242

OTHER PUBLICATIONS

Caplus accession No. 1991:410212 for Japanese Patent No. 2-298553. Asahi Chemical Industry Co., Ltd.
Caplus accession No. 1995:571359 for Japanese Patent No. 7-53833, Japan Synthetic Rubber Co. Ltd.

*Primary Examiner*—Robert E. Sellers
*Attorney, Agent, or Firm*—Oblon, Spivak, McClelland, Maier & Neustadt, P.C.

[57] ABSTRACT

A rubber-modified thermoplastic resin is obtained by polymerizing (b) an aromatic vinyl compound and (c) a vinyl cyanide compound in the presence of (a) a rubbery polymer, and in which the content of the component (a) is 50 to 85% by weight, the content of the component (b) is 5 to 48% by weight and the content of the component (c) is 2 to 45% by weight, and which resin has a Q value of $30 \times 10^{-4}$ to $50 \times 10^{-3}$ and a grafting degree of 5% by weight or more. A thermoplastic resin composition comprising the above rubber-modified thermoplastic resin and at least one other thermoplastic resin is prepared.

16 Claims, No Drawings

POLYMERIZED AROMATIC VINYL AND VINYL CYANIDE ONTO RUBBER

BACKGROUND OF THE INVENTION

This invention relates to a rubber-modified thermoplastic resin which is suitable for being blended with another thermoplastic resin to impart, to the latter, an excellent mechanical strength such as tensile strength, flexural strength or the like and an excellent impact resistance and to a composition comprising the above rubber-modified thermoplastic resin and another thermoplastic resin.

Well-known rubber-modified thermoplastic resins include ABS resins and AES resins and these have been used in a large amount in industry. The following two methods for producing the ABS resin have generally been known:

(1) A method for producing an ABS resin by polymerizing 75 to 95% by weight of a monomer mixture consisting of styrene and acrylonitrile in the presence of 5 to 25% by weight of a rubbery polymer.

(2) A method for producing an ABS resin by blending a high rubber content ABS resin (referred to hereinafter as the rubber-rich ABS resin) obtained by polymerizing 55 to 60% by weight of a monomer mixture consisting of styrene and acrylonitrile in the presence of 40 to 45% by weight of a rubbery polymer, with a styrene-acrylonitrile copolymer (AS resin) obtained by separately polymerizing the monomers, to adjust the rubbery polymer content in the resulting blend to 5 to 25% by weight (the ABS resin obtained by this method is referred to hereinafter as the blend type ABS resin).

The above method (2) can produce with a good productivity many kinds of ABS resins having different qualities by appropriately selecting the amount of the rubber-rich ABS resin blended and appropriately selecting the kind of the AS resin.

However, in the ABS industry, a further cost reduction has been required. As a measure for this cost reduction, it is considered to further increase the rubber content of the rubber-rich ABS resin and increase the amount of the AS resin blended, which AS resin is less expensive and excellent in productivity, thereby enhancing the productivity of the blend type ABS resin. However, according to the present inventors' investigation, when the rubber content of the rubber-rich ABS resin is increased as compared with conventional ones, a blend type ABS resin containing the same shows markedly such an undesirable phenomenon that fish eyes are formed, and is inferior in mechanical strength and impact resistance of molded article to the conventional blend type ABS resin using the conventional rubber-rich ABS resin.

Moreover, the rubber-rich ABS resin is sometime used in the form of a blend with other thermoplastic resins than the AS resin; and when the rubber content of the rubber-rich ABS resin is increased, the same problem as mentioned above is caused with the said blend.

The present inventors have made extensive research on a solution of the above-mentioned problems encountered by the rubber-rich ABS resin having a rubber content of 50 to 85% by weight and have consequently found that the above problems can be solved by modifying the rubber-rich ABS resin having a rubber content of 50 to 85% by weight so that the Q value of the rubber-rich ABS resin becomes $30 \times 10^{-4}$ to $50 \times 10^{-3}$ cc/sec. It has been further found that when the rubber-rich ABS resin is modified so that the storage elastic modulus of the acetone-insoluble matter of the rubber-rich ABS resin falls within the specific range, the above-mentioned problems can be more satisfactorily solved.

SUMMARY OF THE INVENTION

An object of this invention is to provide a rubber-rich ABS resin having an increased rubber content by which the above-mentioned prior art problem has been solved.

Another object of this invention is to provide a thermoplastic resin composition comprising the above mentioned rubber-rich ABS resin with another thermoplastic resin.

Other objects and advantages of this invention will become apparent from the following description.

According to this invention, there is provided a rubber-modified thermoplastic resin which is obtained by polymerizing (b) an aromatic vinyl compound and (c) a vinyl cyanide compound in the presence of (a) a rubbery polymer and in which the content of the component (a) is 50 to 85% by weight, the content of the component (b) is 5 to 48% by weight and the content of the component (c) is 2 to 45% by weight, and which resin has a Q value as defined herein of $30 \times 10^{-4}$ to $50 \times 10^{-3}$ cc/sec and a grafting degree of at least 5% by weight, preferably the acetone-insoluble matter of the rubber-modified thermoplastic resin having a storage elastic modulus of $5 \times 10^7$ to $1 \times 10^9$ Pa.

This invention further provides a thermoplastic resin composition which comprises (A) the above-mentioned rubber-modified thermoplastic resin and (B) at least one other thermoplastic resin, the content of the component (a) in the composition being 3 to 35% by weight.

DETAILED DESCRIPTION OF THE INVENTION

The rubber-modified thermoplastic resin (A) of this invention is obtained by polymerizing (b) an aromatic vinyl compound and (c) a vinyl cyanide compound in the presence of (a) a rubbery polymer, and in the rubber-modified thermoplastic resin (A), the content of the component (a) is 50 to 85% by weight; the content of the component (b) is 5 to 48% by weight; the content of the component (c) is 2 to 45% by weight; the Q value is $30 \times 10^{-4}$ to $50 \times 10^{-3}$ cc/sec; and the grafting degree is at least 5% by weight. It is preferable that the storage elastic modulus of the acetone-insoluble matter of the rubber-modified thermoplastic resin (A) is $5 \times 10^7$ to $1 \times 10^9$ Pa.

The rubbery polymer used as the component (a) in this invention includes, for example, polybutadiene, polyisoprene, styrene-butadiene copolymer (preferably having a styrene content of 5 to 60% by weight), styrene-isoprene copolymer, acrylonitrile-butadiene copolymer, ethylene-α-olefin copolymer, ethylene-α-olefin-polyene copolymer, acrylic rubber, butadiene-(meth)acrylic acid ester copolymer, styrene-butadiene block copolymer, styrene-isoprene block copolymer, hydrogenated styrene-butadiene block copolymer, hydrogenated butadiene polymer, ethylenic ionomer and the like. The styrene-butadiene block copolymer and styrene-isoprene block copolymer include those having a structure of the AB type, the ABA type, the taper type and the radial teleblock type. In addition, the hydrogenated butadiene polymer includes not only hydrogenation products of the above block copolymers but also hydrogenation products of block copolymers consisting of polystyrene block and styrene-butadiene random copolymer block, hydrogenation products of polymers consisting of polybutadiene block having a 1,2-vinyl content of 20% by weight or less and polybutadiene block having a 1,2-vinyl content of more than 20% by weight, etc. These rubbery polymers are used alone or in admixture of two or more.

The component (a) is preferably at least one conjugated diene rubber selected from the group consisting of polybutadiene and styrene-butadiene copolymer (preferably having a styrene content of 5 to 60% by weight), more preferably a mixture of the polybutadiene with the styrene-butadiene copolymer (the weight ratio of the former to the latter is 50–99/1–50).

The aromatic vinyl compound used as the component (b) includes, for example, styrene, t-butylstyrene, α-methylstyrene, p-methylstyrene, divinylbenzene, 1,1-diphenylstyrene, N,N-diethyl-p-aminoethylstyrene, N,N-diethyl-p-aminomethylstyrene, vinylpyridine, vinylxylene, monochlorostyrene, dichlorostyrene, monobromostyrene, fluorostyrene, ethylstyrene, vinylnaphthalene and the like. In particular, styrene and α-methylstyrene are preferable. These aromatic vinyl compounds are used alone or in admixture of two or more.

The vinyl cyanide compound used as the component (c) includes, for example, acrylonitrile and methacrylonitrile.

For the purpose of this invention, (d) other monomers can be used as far as they do not adversely affect the invention. Said other monomers (d) include, for example, acrylic acid esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, benzyl acrylate and the like; methacrylic acid esters such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, benzyl methacrylate and the like; unsaturated acid anhydrides such as maleic anhydride, itaconic anhydride, citraconic anhydride and the like; unsaturated acids such as acrylic acid, methacrylic acid and the like; imide compounds of α- or β-unsaturated dicarboxylic acids (referred to hereinafter as maleimide monomers in some cases) such as maleimide, N-methylmaleimide, N-butylmaleimide, N-(p-methylphenyl)maleimide, N-phenylmaleimide, N-cyclohexylmaleimide, and the like; unsaturated epoxy compounds such as glycidyl methacrylate, allyl glycidyl ether and the like; unsaturated carboxylic acid amides such as acrylamide, methacrylamide and the like; amino group-containing unsaturated compounds such as acrylamine, aminomethyl methacrylate, aminoethyl methacrylate, aminopropyl methacrylate, aminostyrene and the like; hydroxyl group-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and the like; oxazoline group-containing unsaturated compounds such as vinyl oxazoline and the like; etc. These monomers are used alone or in combination of two or more. The content of said other monomers (d) in the component (A) is preferably 20% by weight or less, more preferably 10% by weight or less, based on the total weight of the components other than the component (a).

The content of the component (a) in the rubber-modified thermoplastic resin (A) is 50 to 85% by weight, preferably 52 to 80% by weight, more preferably 54 to 78% by weight, and most preferably 55 to 75% by weight. When the content of the component (a) is less than 50% by weight, the productivity-improving effect is not sufficient, while when the content of the component (a) is more than 85% by weight, many fish eyes are formed and the appearance, impact resistance and mechanical strength are deteriorated.

Also, the content of the component (b) in the rubber-modified thermoplastic resin (A) is 5 to 48% by weight, preferably 5 to 46% by weight, more preferably 10 to 45% by weight and most preferably 15 to 40% by weight. The content of the component (c) is 2 to 45% by weight, preferably 2 to 43% by weight, more preferably 3 to 30% by weight and most preferably 4 to 25% by weight. In each of the cases where the content of the component (b) is less than 2% by weight, the content of the component (b) is more than 48% by weight, the content of the component (c) is less than 2% by weight and the content of the component (c) is more than 45% by weight, at least one of the effects of improving the undesirable phenomenon that fish eyes are formed, improving the appearance, improving the impact resistance and improving the mechanical strength becomes insufficient and it is impossible to keep all these effects at the desired level.

The weight ratio of the component (b) to the component (c) in the rubber-modified thermoplastic resin (A) is preferably 30–97/70–3, more preferably 40–95/60–5, more preferably 50–93/50–7 and most preferably 60–90/40–10.

The Q value of the rubber-modified thermoplastic resin (A) is $30 \times 10^{-4}$ to $50 \times 10^{-3}$ cc/sec, preferably $50 \times 10^{-4}$ to $40 \times 10^{-3}$ cc/sec, more preferably $60 \times 10^{-4}$ to $40 \times 10^{-3}$ cc/sec and most preferably $70 \times 10^{-4}$ to $35 \times 10^{-3}$ cc/sec.

When the Q value is less than $30 \times 10^{-4}$ cc/sec, and even when the Q value is more than $50 \times 10^{-3}$ cc/sec, the many fish eyes are formed, the appearance becomes inferior and the impact resistance is not sufficient.

The conditions for measuring the Q value are as follows:
(1) The resin to be subjected to measurement is conditioned so that the volatile matter content under the conditions of 110° C.×60 minutes is not more than 0.1% by weight.
(2) Conditions for measuring the Q value Measuring apparatus: Shimadzu Flow Tester CAPILLARY RHEOMETER CFT-500

Measuring conditions:
    Sample amount: 1.8 g
    Plunger area: 1.0 cm$^2$
    Die size: 2.0 mm length×1.0 mm φ
    Preheating temp. & time: 200° C.×5 min
    Measuring temp.: 200° C.
    Load: 60 kg/cm$^2$ The grafting degree of the rubber-modified thermoplastic resin (A) is at least 5% by weight, preferably 10 to 100% by weight and more preferably 12 to 80% by weight. When the grafting degree is less than 5% by weight, many fish eyes are formed and the appearance and impact resistance become inferior.

The grafting degree is herein defined as being the proportion of the copolymer component directly graft-bonded to the rubbery polymer to the amount of the rubber in the rubber-modified thermoplastic resin and can be controlled by varying the amount of a polymerization initiator, the polymerization temperature and the like.

The grafting degree is specifically determined as follows:
2 grams of the rubber-modified thermoplastic resin (A) is introduced into acetone at room temperature, the resulting mixture is sufficiently stirred and the weight of the undissolved matter (w) is determined. On the other hand, the weight of the rubbery polymer in the weight of the undissolved matter (w) can be calculated based on the polymerization recipe. The thus calculated weight of the rubbery polymer is taken as R and the grafting degree is determined from the following equation:

Grafting degree (%)=[(w−R)/R]×100.

The storage elastic modulus of the acetone-insoluble matter of the rubber-modified thermoplastic resin (A) is preferably $5\times10^7$ to $1\times10^9$ Pa, more preferably $7\times10^7$ to $8\times10^8$ Pa, most preferably $8\times10^7$ to $5\times10^8$ Pa and particularly preferably $1\times10^8$ to $4\times10^8$ Pa.

When the storage elastic modulus is at least $5\times10^7$ Pa, the mechanical strength is excellent but when the storage elastic modulus exceeds $1\times10^9$ Pa, the impact resistance becomes insufficient.

The conditions for measuring the storage elastic modulus are as follows:

(1) Method of preparing a test piece for measuring storage elastic modulus

The solvent-soluble matter (sol component) other than the rubber and grafted resin component (gel component) in the graft copolymer is dissolved in acetone and removed by centrifugation. The gel component obtained is vacuum-dried to remove the acetone, and thereafter, subjected to melt-pressure-molding to form a sheet having a thickness of 1 mm. This sheet is cut to a ribbon having a size of 40 mm in length and 5 mm in width. This is used as a test piece.

(2) Conditions for measuring storage elastic modulus

Measuring apparatus: Dynamic Mechanical Thermal Analysis (DMTA) apparatus manufactured by Polymer Laboratories Measuring conditions:
  Total sample length: 40 mm
  Sample thickness: 1 mm
  Measuring temp.: 30° C., constant
  Jig shape: Dual cantilever
  Sample length between jigs: 5 mm
  Circular frequency: $2\pi$ rad/s (1 Hz)

The contents of the components (a), (b) and (c) in the rubber-modified thermoplastic resin (A) can be appropriately controlled by varying the amounts of these components charged in the polymerization of them. Also, the contents of the components (a), (b) and (c) in the rubber-modified thermoplastic resin (A) can be determined from the amounts of these components charged, the polymerization conversions and the like. The contents can also be determined even by a known quantitative analysis method.

The control of the Q value and storage elastic modulus of the rubber-modified thermoplastic resin (A) can be effected by appropriately selecting the kinds and amounts of the chain transfer agent, the initiator and the like, appropriately selecting the polymerization temperature, or appropriately selecting the gel content or molecular weight of the rubbery polymer which is the component (a).

The method for producing the rubber-modified thermoplastic resin (A) includes a solution polymerization method, a bulk polymerization method, a suspension polymerization method, an emulsion polymerization method and a combination thereof. The emulsion polymerization method is preferred, and in this emulsion polymerization method, a generally known polymerization adjuvant can be used.

The polymerization initiator used in the production of the rubber-modified thermoplastic resin (A) of this invention includes various organic peroxides such as hydroperoxides, alkyl peresters, percarbonates and the like, and preferable are cumene hydroperoxide, diisopropylbenzene hydroperoxide and t-butyl peroxyisopropyl carbonate. In particular, when t-butyl peroxyisopropyl carbonate is used the effect of this invention becomes much better.

The amount of the above initiator used is preferably 0.1 to 2 parts by weight per 100 parts by weight of a total weight of the rubber components and the monomer components.

The chain transfer agent includes, for example, halogenated hydrocarbons (for example, chloroform, bromoform and the like), mercaptans (for example, n-dodecylmercaptan, t-dodecylmercaptan, n-octylmercaptan, n-hexadecylmercaptan and the like), terpenes (for example, dipentene, terpinolene and the like) and α-methylstyrene dimer.

The intrinsic viscosity of the methyl ethyl ketone-soluble matter of the rubber-modified thermoplastic resin which is the component (A) is preferably 0.15 to 1.5 dl/g, more preferably 0.2 to 1.2 dl/g, most preferably 0.25 to 1 dl/g and particularly preferably 0.3 to 0.8 dl/g, as measured in methyl ethyl ketone at 30° C.

The at least one other thermoplastic resin (B) to be mixed with the rubber-modified thermoplastic resin (A) in this invention includes, for example, styrene resins such as ABS resin having a rubbery polymer content of less than 50% by weight, AES resin having a rubbery polymer content of less than 50% by weight, AAS resin having a rubbery polymer content of less than 50% by weight, AS resin, HIPS, PS and the like; olefin resins such as polyethylene, polypropylene and the like; polyamide resins such as PA6, PA66, PA46, PA12 and the like; polyester resins such as polybutylene terephthalate, polyethylene terephthalate, polyarylate and the like; polycarbonate resins; polyphenylene ether resins such as polyphenylene ether, polyphenylene ether/styrene resins and the like; polyacetal; vinyl chloride resin; polysulfone; polyphenylene sulfide (PPS); polyethersulfone; ethylene-vinyl acetate copolymer; ethylene-vinyl acetate copolymer hydrolyzate (EVOH); and the like. These can be used alone or in combination of two or more.

The thermoplastic resin (B) is preferably the following a. and b. which are used alone or in combination of two or more:

a. Rubber-modified thermoplastic resins having a rubbery polymer content of less than 50% by weight obtained by polymerizing a monomer mixture consisting of at least two types of monomers selected from the group consisting of aromatic vinyl compounds, vinyl cyanide compounds, (meth)acrylic acid esters and maleimide monomers in the presence of a rubbery polymer, in other words, rubber-modified thermoplastic resins other than the rubber-modified thermoplastic resin (A) [referred to hereinafter as the rubber-modified thermoplastic resin (C)]. Incidentally, the rubbery polymer and monomers used here may be those mentioned above. Also, the intrinsic viscosity of the methyl ethyl ketone-soluble matter of the rubber-modified thermoplastic resin is preferably 0.2 to 1 dl/g, more preferably 0.3 to 0.6 dl/g, as measured in methyl ethyl ketone at 30° C.

b. Copolymers obtained by polymerizing a monomer mixture consisting of at least two types of monomers selected from the group consisting of aromatic vinyl compounds, vinyl cyanide compounds, (meth)acrylic acid esters and maleimide monomers which copolymers have an intrinsic viscosity of preferably 0.2 to 1.3 dl/g, more preferably 0.3 to 1 dl/g and most preferably 0.35 to 0.7 dl/g as measured in methyl ethyl ketone at 30° C.

The above rubber-modified thermoplastic resins a. include, for example, ABS resins, AES resins, AAS resins, MBS resins and the like, among which ABS resins and AES resins are preferable.

The above copolymers b. include the following copolymers:

(i) Copolymers of aromatic vinyl compounds with vinyl cyanide compounds. The composition of the copolymer is preferably such that the proportion of the aromatic vinyl compound is 50 to 99% by weight and the proportion of the vinyl cyanide compound is 1 to 50% by weight.
(ii) Copolymers of aromatic vinyl compounds with (meth) acrylic acid esters.
(iii) Copolymers of aromatic vinyl compounds, maleimide monomers and if necessary vinyl cyanide compounds and/or (meth)acrylic acid esters.

Incidentally, in place of the above maleimide monomer, an unsaturated acid anhydride monomer is used to obtain a copolymer and this copolymer is imidized. The thus obtained post-imidized type copolymer is also included in the copolymers (iii).

The aromatic vinyl compounds, vinyl cyanide compounds, (meth)acrylic acid esters and maleimide monomers used here include those mentioned above.

Instead of the definition of the composition ratio of each component of the thermoplastic resin composition comprising (A) the rubber-modified thermoplastic resin and (B) at least one other thermoplastic resin, these components (A) and (B) are blended so that the rubbery polymer which is the component (a) of the rubber-modified thermoplastic resin (A) may be contained, preferably in a proportion of 3 to 35% by weight, in the composition. The component (a) may be contained most preferably in a proportion of 5 to 25% by weight. When the content of the component (a) is less than 3% by weight, a sufficient impact strength is not obtained. On the other hand, when the content of the component (a) is more than 35% by weight, the molded article obtained therefrom becomes soft, which is not desirable.

The weight ratio of the component (A) to the component (B) is preferably 5–99/95–1, more preferably 7–95/93–5 and most preferably 10–90/90–10.

When the rubber-modified thermoplastic resins (C) which are other than the rubber-modified thermoplastic resin (A) of this invention are used as the thermoplastic resin (B), the rubbery polymer [referred to hereinafter as the component (a')] contained in the rubber-modified thermoplastic resin (C) is handled as follows:

The component (a') is also regarded as the component (a) and must satisfy the following conditions:

The total content of the components (a) and (a') is 3 to 35% by weight and the content of the component (a) is 3 to 35% by weight. Preferably, the content of the components (a) and (a') is 5 to 25% by weight and the content of the component (a) is 5 to 25% by weight.

The thermoplastic resin composition of this invention can be prepared by kneading the rubber-modified thermoplastic resin (A) and at least one other thermoplastic resin (B) with, if necessary, various additives.

The kneading method includes methods using an extruder, a twin-roll mill, a Banbury mixer, a kneader and the like.

Preferably, the kneading method is a method using an extruder, and the extruder includes a single screw extruder, a twin-screw extruder and the like.

In kneading the various components by the above kneading method, all the components may be kneaded together, or a part of the components may be first kneaded followed by adding and kneading the remaining components in one portion or portions. Also, if necessary, various additives may be added to the rubber-modified thermoplastic resin (A). If kneading is required in this case, the kneading may be effected by the above-mentioned method.

The above various additives include known coloring agents, pigments, lubricants, weathering agents, antistatic agents, antioxidants, flame retardants, heatage resistors, plasticizers, antibacterial agents, antifungal agents and the like.

The thermoplastic resin composition of this invention can be molded into various molded articles by injection molding, sheet-extrusion molding, vacuum-forming, profile-extrusion molding, injection press molding, expansion molding, blow molding, injection blow molding or the like.

The rubber-modified thermoplastic resin (A) of this invention, even when has a high rubber component content, can be blended with at least one other thermoplastic resin (B), and the molded articles obtained from the resulting blend are excellent in gloss, impact resistance and mechanical strength and greatly improved so that such an undesirable phenomenon that fish eyes are formed does not occur.

In addition, since the rubber-modified thermoplastic resin (A) has a high rubber component content, the blending thereof even in a small amount results in an improvement in impact resistance and mechanical strength, so that various kinds of ABS resins can be easily prepared by selecting among many kinds of AB resins suitably. A lot of kinds of ABS resins can be further prepared, since amounts and kinds of additives and the like are possible to be widely varied in their use.

Moreover, since such thermoplastic resins as AS resins are excellent in productivity and less expensive, the rubber-modified thermoplastic resin (A) of this invention can be blended therewith to mass-produce inexpensive ABS resins with an excellent productivity.

DESCRIPTION OF PREFERRED EMBODIMENTS

Examples are shown below to explain this invention in more detail.

Incidentally, in the Examples, parts and % are by weight unless otherwise specified.

In the Examples, various evaluation values are values obtained by the following methods.
(1) Measurement of Q Value
  (i) The resin used in the measurement was such that the content of the volatile matter under the conditions of 110° C.×60 minutes was adjusted to 0.1% by weight or less.
  (ii) Conditions for Measuring Q Value
    Measuring apparatus: Shimadzu flow tester CAPILLARY RHEOMETER CFT-500
    Measurement conditions:
      Sample amount: 1.8 g
      Plunger area: 1.0 cm$^2$
      Die size: 2.0 mm length×1.0 mm $\phi$
      Preheating temp. & time: 200° C.×5 min
      Measuring temp.: 200° C.
      Load: 60 kg/cm$^2$
(2) Measurement of Storage Elastic Modulus
  (i) Method of Preparing a Test Piece For Measurement of Storage Elastic Modulus
    The solvent-soluble matter (sol component) other than the rubber and grafted resin component (gel component) in the graft copolymer was dissolved in acetone and removed by centrifugation. The gel component obtained was vacuum-dried to remove the acetone, and then subjected to melt-pressure-molding to form a sheet having a thickness of 1 mm. This sheet was cut to a ribbon of 40 mm in length and 5 mm in width, and this ribbon was used as a test piece.
  (ii) Conditions for Measuring Storage Elastic Modulus
    Measuring Apparatus: Dynamic Mechanical Thermal Analysis (DMTA) Apparatus manufactured by Polymer Laboratories Total sample length: 40 mm
Sample thickness: 1 mm
Measuring temp.: 30° C., constant
Jig shape: Dual cantilever
Sample length between jigs: 5 mm
Circular frequency: 2 π rad/s (1 Hz)

(3) Method of Mixing the Rubber-Modified Thermoplastic Resin (A) With the Thermoplastic Resin (B)

The rubber-modified thermoplastic resin (A), the thermoplastic resin (B) and the additives shown in Table 2 were mixed in the amounts shown in Table 2 by means of a Henschel mixer and the mixture obtained was extruded from an extruder in which the cylinder set temperature was 200° C. to obtain pellets.

(4) Method of Forming Test Pieces for Measuring Izod Impact Strength, for Tensile Test and for Flexural Test The pellets obtained in (3) above were molded under the following conditions to form test pieces for measuring Izod impact strength, for tensile test and for flexural test:

(i) Molding machine: a 5-oz. in-line screw type injection machine (ii) Mold temperature: 50° C.±5° C.

(iii) Molding machine set conditions:
Cylinder set temp.: 200° C.
Injection pressure:
Primary pressure 75–95 kg/cm$^2$
Secondary pressure 50 kg/cm$^2$
Back pressure: 5 kg/cm$^2$
Molding cycle: Injection 15 sec, loading 10 sec, curing 40 sec, cycle start 2 sec (5) Measurement of gloss A digital variable gloss meter (DIGITAL VARIABLE GLOSS METER UGV-5D manufactured by Suga Shikenki K. K.) was used to measure the axis of the incident beam and axis of the receptor at 45°.

(6) Measurement of Izod impact strength

Measured according to ASTM D256 (¼", notched, unit= kg·cm/cm).

(7) Method of measuring fish eyes

A sheet sample for measuring fish eyes was prepared by the following method and subjected to measurement of fish eyes:

(i) A 50-ton press warmed at 220° C. was prepared for.

(ii) 10–15 grams of the pellets obtained in the method stated in (3) above were sandwiched in between SUS-made mold plates (30 cm×30 cm×0.5 mm).

(iii) The resulting assembly per se was inserted into the press and a pressure of 0 to 0.5 kg/cm$^2$ was applied thereto, after which the press was warmed for five minutes.

(iv) The pressure was slowly increased (to 10 kg/cm$^2$) and the pellet sample (molten) pressed out from between the mold plates was slowly drawn out.

(v) The sample was drawn out in the form of a film until at least 1 m of a film having a thickness of about 10 to 30 μm was obtained.

(vi) A circle of 3.57 cm in diameter (area: 10 cm$^2$) was drawn on the film sample and the number of fish eyes in the circle was counted (those having a diameter of 0.2 mm or more).

(vii) The procedure (vi) was repeated three times and the total number of fish eyes was divided by the total area to determine the number of fish eyes per cm$^2$, which was taken as fish eye-evaluation value.

(8) Measurement of tensile strength

Tensile strength and elongation were measured according to ASTM D638.

Test specimen: ASTM type I Length: 21.6 cm Center width: 1.27 cm Thickness: 0.32 cm Speed of testing: 5.0 cm/min The tensile strength TS (kgf/cm$^2$) and elongation E (%) of each test specimen were calculated.

(9) Measurement of Flexural Strength

The flexural strength was measured according to ASTM D790.

Test specimen: Length: 10.0 cm Width: 2.5 cm Thickness: 0.32 cm

Rate of crosshead motion: 1.5 cm/min

The flexural strength FS (kgf/cm$^2$) and flexural modulus FM (kgf/cm$^2$) of each test specimen were calculated.

[Process-1 for producing rubber-modified thermoplastic resin (A)]

In a flask were placed 54 parts in terms of solid content of a polybutadiene rubber latex, 6 parts in terms of solid content of a styrene-butadiene copolymer rubber latex, 150 parts of deionized water, 7 parts of styrene, 3 parts of acrylonitrile and 0.2 part of t-dodecylmercaptan, and the temperature in the flask was elevated to 60° C., after which a solution of 0.2 part of sodium pyrophosphoric acid, 0.01 part of ferrous sulfate hydrate and 0.4 part of glucose in 20 parts of deionized water was added thereto. To the resulting mixture was further added 0.1 part of cumene hydroperoxide to initiate polymerization, and the bath temperature was kept at 70° C. After the mixture was subjected to polymerization for 1 hour, 22 parts of styrene, 8 parts of acrylonitrile, 0.5 part of t-dodecylmercaptan and 0.2 part of cumene hydroperoxide were continuously added over 2 hours, and they were subjected to polymerization for a further 1 hour to complete the polymerization. The copolymer latex obtained was coagulated with sulfuric acid, washed with water and dried to obtain ABS-1 as shown in Table 1.

The same procedure as above was repeated, except that t-butyl peroxyisopropyl carbonate was substituted for the cumene hydroperoxide to obtain ABS-2 as shown in Table 1.

The same procedure as above was repeated, except that in the recipe of ABS-1, the amount of rubber and the amount of t-dodecylmercaptan were changed as shown in Table 1 to obtain ABS-3, 5, 6, 7 or 8 as shown in Table 1.

The same procedure as in ABS-3 was repeated, except that t-butyl peroxyisopropyl carbonate was substituted for the cumene hydroperoxide to obtain ABS-4 as shown in Table 1.

TABLE 1

|  | ABS | | | | | | | |
|---|---|---|---|---|---|---|---|---|
|  | 1 | 2 | 3 | 4 | 5 | 6 | 7 | 8 |
| Constituents (%) | | | | | | | | |
| Rubber | 60 | 60 | 60 | 57 | 70 | 60 | 70 | 55 |
| Styrene | 28 | 28 | 28 | 30 | 21 | 28 | 21 | 31 |
| Acrylonitrile | 12 | 12 | 12 | 13 | 9 | 12 | 9 | 14 |
| Grafting degree | 31 | 40 | 35 | 38 | 19 | 41 | 5 | 25 |
| Q value × $10^{-4}$ (cc/sec) | 120 | 330 | 80 | 150 | 70 | 20 | 15 | 600 |
| Storage elastic modulus (× $10^8$ Pa) | 2.24 | 3.15 | 8.93 | 0.32 | 11.30 | 2.62 | 12.4 | 2.08 |

[Thermoplastic resin]

AS-1: A copolymer of 75% of styrene and 25% of acrylonitrile having [η] (intrinsic viscosity of methyl ethyl ketone-soluble matter) of 0.4 dl/g as measured in methyl ethyl ketone at 30° C.

AS-2: A copolymer of 75% of styrene and 25% of acrylonitrile having [η] of 0.6 dl/g as measured in methyl ethyl ketone at 30° C.

AS-3: A copolymer of 70% of styrene and 30% of acrylonitrile having [η] of 0.7 dl/g as measured in methyl ethyl ketone at 30° C.

Examples 1 to 9 and Comparative Examples 1 to 3

Examples 1 to 9 are thermoplastic resins in which a rubber-modified thermoplastic resin having a Q value falling within the scope of this invention was used. Comparative Examples 1 and 3 are thermoplastic resins in which a rubber-modified thermoplastic resin having a Q value outside the scope of this invention was used.

Compounding recipes and evaluation results are shown in Table 2.

TABLE 2

|  | Example | | | | | | | | | Comparative Example | | |
|---|---|---|---|---|---|---|---|---|---|---|---|---|
|  | 1 | 2 | 3 | 4 | 5 | 6 | 7 | 8 | 9 | 1 | 2 | 3 |
| Compounding recipe (part) | | | | | | | | | | | | |
| ABS-1 | 30.83 | | | | | 25.0 | | 45.0 | | | | |
| -2 | | 30.83 | | | | | 25.0 | | 34.0 | | | |
| -3 | | | 30.83 | | | | | | | 30.83 | | |
| -4 | | | | 32.46 | | | | | | | 26.43 | |
| -5 | | | | | 26.43 | | | | | | | 33.64 |
| AS-1 | 69.17 | 69.17 | 69.17 | 67.54 | 73.57 | 45.0 | 45.0 | | | 69.17 | 73.57 | 66.46 |
| AS-2 | | | | | | 30.0 | 30.0 | 36.7 | 36.7 | | | |
| AS-3 | | | | | | | | 18.3 | 18.3 | | | |
| Ethylene-bisstearylamide | 1.0 | 1.0 | 1.0 | 1.0 | 1.0 | 0.8 | 0.8 | 0.9 | 0.9 | 1.0 | 1.0 | 1.0 |
| Magnesium stearate | 0.3 | 0.3 | 0.3 | 0.3 | 0.3 | 0.25 | 0.25 | 0.2 | 0.2 | 0.3 | 0.3 | 0.3 |
| Rubber component content in thermoplastic resin composition (%) | 18.5 | 18.5 | 18.5 | 18.5 | 18.5 | 15.0 | 15.0 | 27.0 | 27.0 | 18.5 | 18.5 | 18.5 |
| Gloss (%) | 92.1 | 93.8 | 91.9 | 92.4 | 91.4 | 93.3 | | | | | | |
| Fish eyes (point/cm²) | 0.48 | 0.25 | 0.51 | 0.37 | 0.77 | 0.32 | | | | | | |
| Izod impact strength (kgf · cm/cm) | 25.9 | 27.2 | 25.6 | 26.1 | 24.3 | 22.1 | | | | | | |
| Tensile strength (kgp/cm²) | 441 | 445 | 430 | 413 | 407 | 484 | | | | | | |
| Tensile elongation (%) | 29 | 35 | 23 | 18 | 14 | 33 | | | | | | |
| Flexural strength (kgt/cm²) | 749 | 733 | 748 | 732 | 723 | 857 | | | | | | |
| Flexural modulus (kgf/cm²) | 24300 | 23700 | 24800 | 23000 | 21900 | 27600 | | | | | | |

TABLE 2-continued

|  |  |  |  |  |  |
|---|---|---|---|---|---|
| 92.1 | 82.7 | 82.3 | 89.8 | 87.6 | 86.3 |
| 0.38 | 0.47 | 0.58 | 3.04 | 4.54 | 1.24 |
| 20.3 | 42.9 | 41.3 | 21.2 | 20.7 | 14.8 |
| 470 | 381 | 379 | 402 | 396 | 438 |
| 24 | 35 | 22 | 23 | 7 | 29 |
| 842 | 677 | 672 | 706 | 691 | 737 |
| 26200 | 21100 | 20600 | 22600 | 19300 | 23300 |

In Examples 1 to 9, the gloss and impact resistance of a molded article were excellent and such an undesirable phenomenon that fish eyes were formed was inhibited as is clear from a comparison with Comparative Examples 1 to 3.

[Process-2 for producing rubber-modified thermoplastic resin (A)]

In Table 3, ABS-9 was produced in the same manner as ABS-1 was; ABS-10 and ABS-12 were produced in the same manner as ABS-9 and ABS-11 were produced, respectively, except that t-butyl peroxyisopropyl carbonate was substituted for the cumene hydroperoxide. In ABS-11, ABS-13, ABS-14 and ABS-15, the same compounding recipe as in ABS-9 was used, except that the amounts of rubber, t-dodecylmercaptan and initiator were varied as shown in Table 3, and the other conditions were the same as in ABS-1.

TABLE 3

|  | ABS | | | | | | |
|---|---|---|---|---|---|---|---|
|  | 9 | 10 | 11 | 12 | 13 | 14 | 15 |
| Constituents (%) | | | | | | | |
| Rubber | 60 | 60 | 70 | 56 | 60 | 70 | 55 |
| Styrene | 29 | 29 | 22 | 31 | 29 | 22 | 32 |
| Acrylonitrile | 11 | 11 | 8 | 13 | 11 | 8 | 13 |
| Grafting degree (%) | 32.4 | 44.4 | 21.4 | 45.0 | 12.8 | 18.5 | 41.2 |
| Q value × $10^{-4}$ (cc/sec) | 310 | 210 | 75 | 270 | 330 | 90 | 240 |
| Storage elastic modulus (Pa) | $1.88 \times 10^8$ | $2.04 \times 10^8$ | $2.81 \times 10^8$ | $2.37 \times 10^8$ | $0.34 \times 10^8$ | $11.9 \times 10^8$ | $0.46 \times 10^8$ |

Examples 10 to 18

Examples 10 to 18 are thermoplastic resin compositions in which a rubber-modified thermoplastic resin falling with the scope of this invention was used.

Compounding recipes and evaluation results are shown in Table 4.

TABLE 4

|  | Example | | | | | |
|---|---|---|---|---|---|---|
|  | 10 | 11 | 12 | 13 | 14 | 15 |
| Compounding recipe | | | | | | |
| ABS-9 | 29.17 |  |  |  | 30.83 |  |
| -10 |  | 29.17 |  |  |  | 30.83 |
| -11 |  |  | 25.00 |  |  |  |
| -12 |  |  |  | 31.82 |  |  |
| -13 |  |  |  |  |  |  |
| -14 |  |  |  |  |  |  |
| -15 |  |  |  |  |  |  |
| AS-1 |  |  |  |  | 69.17 | 69.17 |
| AS-2 | 70.83 | 70.83 | 75.00 | 68.18 |  |  |
| Ethylene-bisstearylamide | 0.70 | 0.70 | 0.70 | 0.70 | 1.00 | 1.00 |

TABLE 4-continued

| | | | | | | |
|---|---|---|---|---|---|---|
| Magnesium stearate | 0.20 | 0.20 | 0.20 | 0.20 | 0.30 | 0.30 |
| Rubber component content in thermoplastic resin composition (%) | 17.5 | 17.5 | 17.5 | 17.5 | 18.5 | 18.5 |
| Izod impact strength (kgf · cm/kg) | 28.4 | 28.9 | 27.3 | 27.8 | 24.9 | 23.6 |
| Tensile strength (kgp/cm$^2$) | 482 | 477 | 493 | 490 | 440 | 454 |
| Tensile elongation (%) | 32 | 30 | 41 | 39 | 35 | 29 |
| Flexural strength (kgf/cm$^2$) | 826 | 817 | 822 | 832 | 746 | 766 |
| Flexural modulus (kgf/cm$^2$) | 26500 | 26300 | 27000 | 27100 | 24100 | 24300 |
| Gloss (%) | 92.6 | 92.1 | 91.5 | 92.9 | 93.6 | 92.7 |
| Fish eyes (point/cm$^2$) | 0.25 | 0.27 | 0.53 | 0.36 | 0.27 | 0.63 |

| | 16 | 17 | 18 |
|---|---|---|---|
| | 29.17 | | |
| | | 25.00 | |
| | | | 31.82 |
| | 70.83 | 75.00 | 68.18 |
| | 0.70 | 0.70 | 0.70 |
| | 0.20 | 0.20 | 0.20 |
| | 17.5 | 17.5 | 17.5 |
| | 21.6 | 19.8 | 22.5 |
| | 431 | 488 | 456 |
| | 39 | 8 | 46 |
| | 780 | 811 | 772 |
| | 23200 | 26600 | 22400 |
| | 93.3 | 91.0 | 92.6 |
| | 0.29 | 0.72 | 0.38 |

As is clear from comparison with Examples 4 and 5, Examples 1 to 3 and 14 and 15 are excellent in gloss, impact resistance and fish eyes and also improved in mechanical strength.

What is claimed is:

1. A rubber-modified thermoplastic resin, which is obtained by polymerizing (b) an aromatic vinyl compound and (c) a vinyl cyanide compound in the presence of (a) a rubber polymer and in which the content of the component (a) is 50 to 85% by weight, the content of the component (b) is 5 to 48% by weight and the content of the component (c) is 2 to 45% by weight, and which resin has a Q value of 30×10$^{-4}$ to 50×10$^{-3}$ cc/sec and a grafting degree of 5% by weight or more.

2. The rubber-modified thermoplastic resin according to claim 1, the acetone-insoluble matter of which has a storage elastic modulus of 5×10$^7$ to 1×10$^9$ Pa.

3. The rubber-modified thermoplastic resin according to claim 1, wherein the rubber polymer (a) is at least one conjugated diene rubber selected from the group consisting of polybutadiene and styrene-butadiene copolymer.

4. The rubber-modified thermoplastic resin according to claim 3, wherein the rubber polymer (a) is a mixture of polybutadiene with a styrene-butadiene copolymer in which the weight ratio of the polybutadiene to the styrene-butadiene copolymer is 50–99/1–50.

5. The rubber-modified thermoplastic resin according to claim 1, wherein the aromatic vinyl compound (b) is at least one monomer selected from the group consisting of styrene and α-methylstyrene.

6. The rubber-modified thermoplastic resin according to claim 1, wherein the vinyl cyanide compound (c) is selected from the group consisting of acrylonitrile and methacrylonitrile.

7. The rubber-modified thermoplastic resin according to claim 1, wherein the component (b) and the component (c) are polymerized together with (d) at least one monomer selected form the group consisting of acrylic acid esters, methacrylic acid esters, unsaturated acid anhydrides, unsaturated acids, imide compounds of α- or β-unsaturated dicarboxylic acids, unsaturated epoxy compounds, unsaturated carboxylic acid amides, amino group-containing unsaturated compounds, hydroxyl group-containing unsaturated compounds and oxazoline group-containing unsaturated compounds.

8. The rubber-modified thermoplastic resin according to claim 7, wherein the content of the component (d) in the rubber-modified thermoplastic resin is 10% by weight or less based on the total weight of the components other than the component (a).

9. The rubber-modified thermoplastic resin according to claim 1, wherein the content of the rubber polymer is 52 to 80% by weight.

10. The rubber-modified thermoplastic resin according to claim 1, wherein the content of the aromatic vinyl compound (b) is 5 to 46% by weight.

11. The rubber-modified thermoplastic resin according to claim 1, wherein the content of the vinyl cyanide compound (c) is 3 to 30% by weight.

12. The rubber-modified thermoplastic resin according to claim 1, wherein the weight ratio of the component (b) to the component (c) is 30–97/70–3.

13. The rubber-modified thermoplastic resin according to claim 1, wherein the Q value is 50×10$^{-4}$ to 40×10$^{-3}$ cc/sec.

14. The rubber-modified thermoplastic resin according to claim 1, wherein the grafting degree is 10 to 100% by weight.

15. The rubber-modified thermoplastic resin according to claim 2, wherein the storage elastic modulus is 7×10$^7$ to 8×10$^8$ Pa.

16. The rubber-modified thermoplastic resin according to claim 1, the methyl ethyl ketone-soluble matter of which has an intrinsic viscosity of 0.15 to 1.5 dl/g as measured at 30° C. in methyl ethyl ketone.

* * * * *